United States Patent [19]

O'Biso

[11] 4,379,337
[45] Apr. 5, 1983

[54] METRIC COMPUTER

[76] Inventor: Ilda O'Biso, 24 Northwest St., Lincoln Park, N.J. 07035

[21] Appl. No.: 229,318

[22] Filed: Jan. 29, 1981

Related U.S. Application Data

[63] Continuation of Ser. No. 55,827, Jul. 9, 1979, abandoned, and a continuation of Ser. No. 818,397, Jul. 25, 1977, abandoned.

[51] Int. Cl.³ .............................................. G06F 15/20
[52] U.S. Cl. ............................ 364/715; 116/DIG. 3; 116/DIG. 37; 116/DIG. 47; 364/710
[58] Field of Search ................ 364/715, 710; 235/310; 340/711; 116/DIG. 3, DIG. 37, DIG. 47

[56] References Cited

U.S. PATENT DOCUMENTS

| | | | |
|---|---|---|---|
| 3,987,290 | 10/1976 | Dickinson | 235/310 X |
| 4,078,257 | 3/1978 | Bagley | 364/900 |
| 4,092,523 | 5/1978 | Tara et al. | 235/310 |
| 4,100,602 | 7/1978 | Shapiro | 364/715 |

Primary Examiner—David H. Malzahn
Attorney, Agent, or Firm—Brumbaugh, Graves, Donohue & Raymond

[57] ABSTRACT

The present invention discloses a device which will automatically display the metric equivalents and their appropriate dimensional designations of any given metric measurement. In the preferred embodiments shown, the device may be either an electronic keyboard-display console apparatus or a mechanical device using printed rolls.

2 Claims, 5 Drawing Figures

METRIC COMPUTER

This is a continuation of application Ser. No. 818,397 filed July 25, 1977 abandoned and Ser. No. 055,827 filed July 9, 1979 now abandoned.

BACKGROUND OF THE INVENTION

The basic system by which any two like objects can be compared is referred to the system of weights and measures, which establishes standards for measuring various parameters such as length, weight and liquid. Each parameter may have a number of different dimensional or unit designations which represent a measurement of that parameter. For example, the parameter liquid may be expressed in pints, quarts, gallons, and so on. These related unit representations of a given parameter so pervade the everyday activities of the average person that a spontaneous awareness of their significance is necessary to deal with day to day affairs at work, at home and in purchasing activities.

Most countries throughout the world have adopted an international system of weights and measures referred to as the metric system. The United States, however, owing to its historical ties to Great Britain, has adopted and continues to use a system of weights and measures based upon the early British system. As opposed to the arbitrary British system, the metric system was established based upon scientific criteria. It establishes a basic unit for each parameter as well as equivalents thereof based upon some multiple of 10 or division by a multiple of 10 of the basic unit. Thus looking to the basic unit of length as the meter, the basic unit of liquid as the liter, and the basic unit of mass and weight as the gram, the most commonly used metric measurements are as follows:

| UNIT | LENGTH NUMBER OF METERS |
|---|---|
| kilometer | 1,000 |
| hectometer | 100 |
| decameter | 10 |
| meter | 1 |
| decimeter | 0.1 |
| centimeter | 0.01 |
| millimeter | 0.001 |
| UNIT | LIQUID NUMBER OF LITERS |
| kiloliter | 1,000 |
| hectoliter | 100 |
| decaliter | 10 |
| liter | 1 |
| deciliter | 0.10 |
| centiliter | 0.01 |
| milliliter | 0.001 |
| UNIT | MASS and WEIGHT NUMBER OF GRAMS |
| kilogram | 1,000 |
| hectogram | 100 |
| decagram | 10 |
| gram | 1 |
| decigram | 0.10 |
| centigram | 0.01 |
| milligram | 0.001 |

Both for these reasons and due to the need for international unformity, the United States has commited itself to a policy of promoting the adoption of the metric system in this country. See the Metric conversion Act of 1975, 89 Stat. 1007.

In spite of the long term advantages to be gained by a changeover to the metric system, the average person is now faced with the prospect of having a system of weights and measures with which he is totally familiar replaced with one with which he is equally unfamiliar. As opposed to the everyday instinctive knowledge by which the significance of a relative unit of measurement of the American system is understood because of education and experience (for example, one is quite familiar with the fact that one yard is larger than one foot, and that in fact three feet constitute one yard), the average person, upon introduction of the metric system, may find himself confronted by an apparent deluge of confusing dimensional designations.

More specifically, the problems facing the average person with the adoption of the metric system occur when he sees a measurement, for example, of one decimeter, and, due to his unfamiliarity with the metric system, may incur difficulty in picturing just what length that measurement refers to relative to other metric measurements. It is, therefore, desirable to provide such a person with a ready means for comparing such a measurement with its metric equivalents. Moreover, since the measurements to be encountered will have a number of possible parameters each having a separate system of units, it is desirable to provide a ready means wherein a measurement in any one of these parameters may be compared with the metric equivalent units within its same parameter.

SUMMARY OF THE INVENTION

In accordance with the invention, there is provided a device whereby one or more metric equivalents of any specified metric measurement are automatically displayed. The preferred embodiment relates to an apparatus having display means for the metric units (e.g. liter, decaliter) relating to a given parameter (e.g. liquid) as well as display means for the numerical measurements corresponding to each unit displayed. More particularly, the apparatus is preferably arranged with two sets of seven display stations or windows, one set of windows depicting the seven metric units within a given parameter (e.g. length), and one set of windows depicting a given measurement (e.g. 1.07 meters) as expressed in each of the seven units. Thus a person who encounters a given measurement, e.g. 0.07 hectometer, may adjust the device to show units of length in the unit display windows and the number 0.07 in the measurement display window corresponding to hectometers. He will immediately see that this measurement is equivalent to seven meters, 0.007 kilometers, etc.

As is more fully described below, the device may be operated by suitable means such as appropriate electronic circuitry or by a mechanical arrangement of printed webs.

BRIEF DESCRIPTION OF THE DRAWINGS

For the purpose of illustrating the invention, reference is made to the accompanying drawings, in which.

DESCRIPTION OF THE PREFERRED EMBODIMENTS

Figure 1:
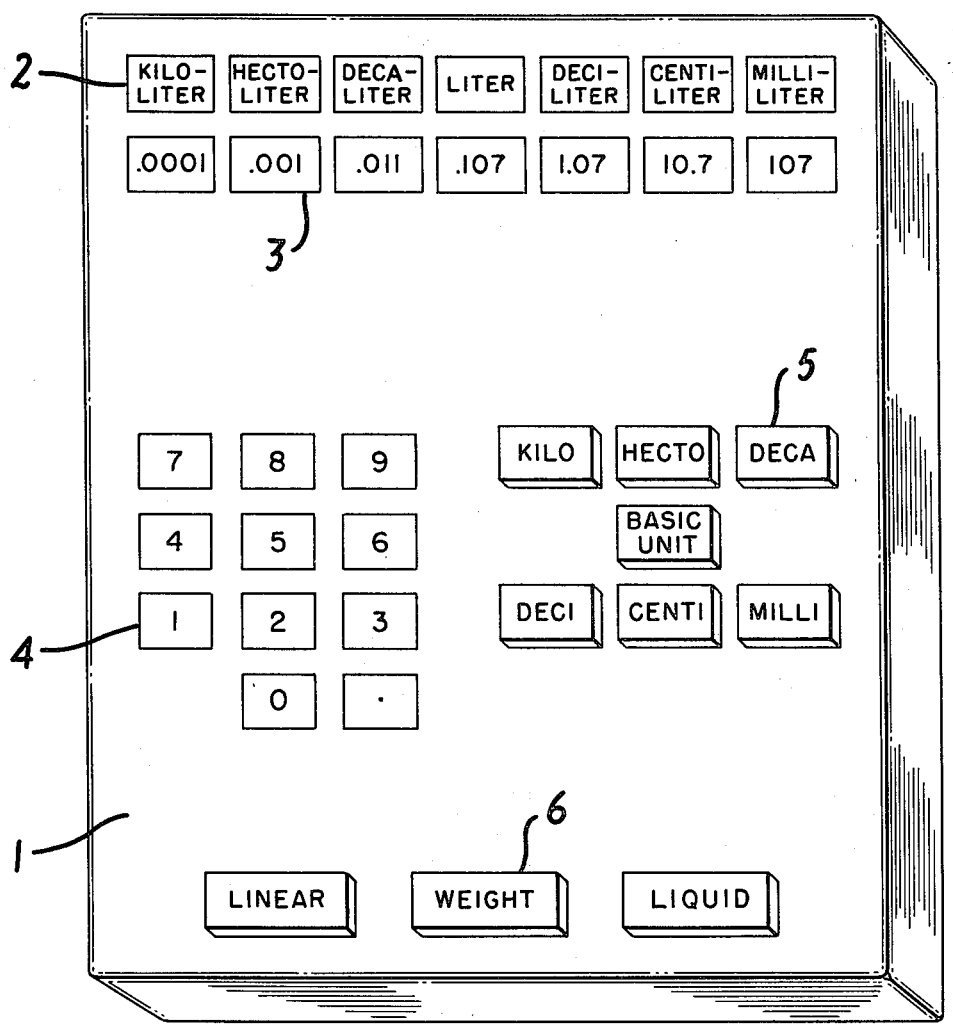
FIG. 1 is a perspective view of an apparatus embodying the present invention.
Figure 2:
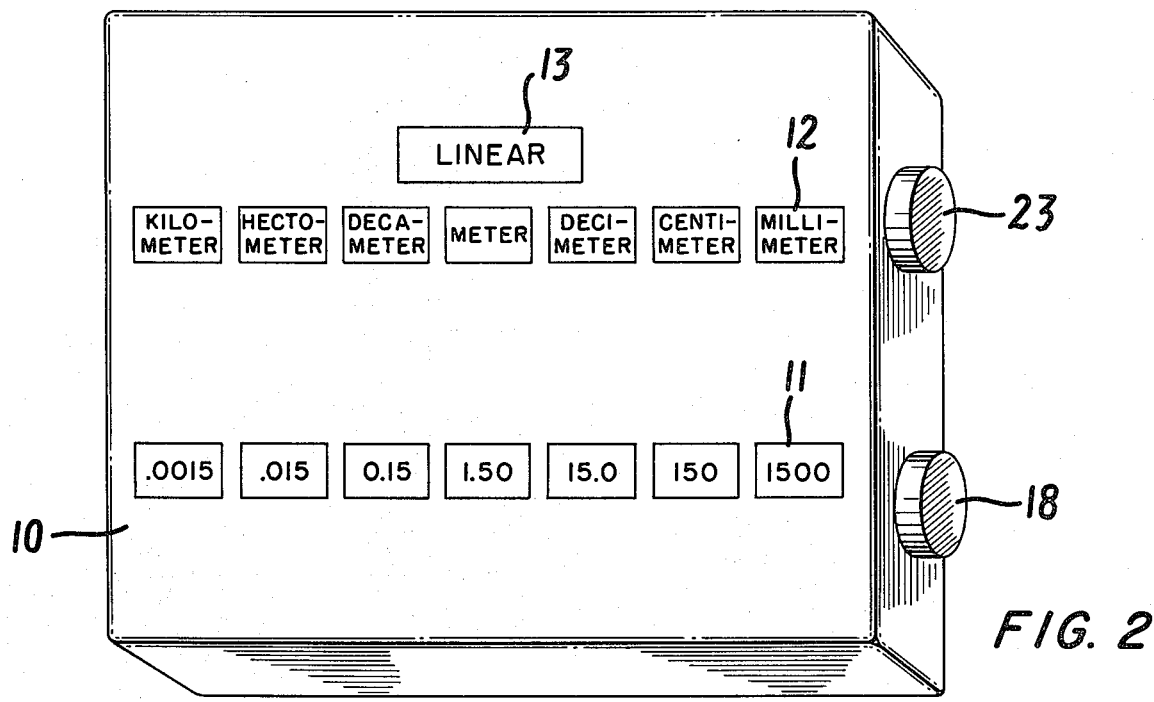
FIG. 2 is a perspective view of another apparatus embodying the present invention.

As illustrated in FIG. 1, one embodiment of the device according to the invention comprises a display console 1 having a first set of unit display windows 2, a second set of measurement display windows 3, a set of digital keys 4, a set of unit keys 5, and a set of parameter keys 6.

The set of unit display windows 2 preferably comprises seven windows whereby the metric unit designation for one thousand times the basic unit, one hundred times the unit, ten times the unit, the basic unit of the parameter, one tenth the unit, one hundredth the unit, and one thousandth of the unit are displayed.

The set of measurement display windows 3 comprises seven windows each of which is arranged in register with or otherwise situated such that it can be seen to correspond to one of the unit display windows and wherein the numerical measurement in the particular unit designation is displayed. Conventional electronic means are employed whereby the digits are displayed in the aforementioned manner following the input of a known measurement in a given unit in a manner described below.

The set of digital keys 4 comprises one key representing each of the digits 0 through 9 and additionally a key representing a decimal point for entering the numeral portion of a known measurement in one of the windows of the second set of windows 3.

The set of unit keys 5 comprises a key labelled "basic unit", representing the basic unit of a parameter, a key labelled "deca" representing ten times the basic unit, a key labelled "hecto" representing one hundred times the basic unit, a key labelled "kilo" representing one thousand times the basic unit, a key labelled "deci" representing one tenth of the basic unit, a key labelled "centi" representing one hundreth of the basic unit, and a key labelled "milli" representing one thousandth of the basic unit. Means are provided such that the number entered using the set of digital keys 4 will be displayed in the window of the second set of display windows 3 corresponding to the unit designation chosen for that number by means of the unit keys 5.

The set of parameter keys 6 comprises a key labelled "linear" representing the basic unit "meter", a key labelled "weight" representing the basic unit "gram", and a key labelled "liquid" representing the basic unit "liter". Conventional electronic or mechanical means are provided whereby upon pressing one of the parameter keys 6 the appropriate metric unit designations are displayed in the first set of display windows 2.

In operating the embodiment shown in FIG. 1 (which embodiment includes a power source, not shown), the metric equivalents of a given metric measurement are obtained by first pressing the appropriate parameter key 6 representing the parameter of the known measurement. For example, if the known measurement is 1.07 deciliter, the key "liquid" is pressed. Upon pressing the parameter key, the seven metric unit designations described in connection with the first set of display windows 2 will appear therein. The known measurement is entered by pressing in sequence the digit keys for the numerals "1" "." "0" and "7" and pressing the unit key corresponding to the prefix "deci", whereupon the metric equivalents of the measurement 1.07 deciliter are caused by electronic circuit means to appear in the measurement display windows underneath or otherwise in visual correspondence with the corresponding unit display windows.

Another embodiment of the present invention is illustrated in FIGS. 2 through 5. An apparatus is shown having a housing 10, a first set of seven windows 11, a second set of seven windows 12 and a third row viewing window 13.

The housing 10 contains a first rotating reel 14, and a second rotating reel 15, said reels having pulleys 14a and 15a, respectively, attached thereto, and a belt 16 engaging pulleys 14a and 15a to provide corresponding rotation thereof. A continuous sheet or web 17 is wrapped around and extends between the reels 14 and 15.

An external knob 18 is provided for rotating the reels 14 and 15, thereby moving a portion of the continuous web 17 from one reel toward the other. A web guide 19 is provided for biasing the surface of the continuous web 17 against the bottom surface of the first set of windows 11.

The housing 10 also contains an endless web 20 having a web guide 21 for biasing a portion of the surface of the web 20 in a substantially flat position under the second set of windows 12 and the third row viewing window 13. A rotating spindle 22 has a handle 23 whereby the endless web 20 is moved by rotation of the handle 23.

Figures 3, 4, 5:
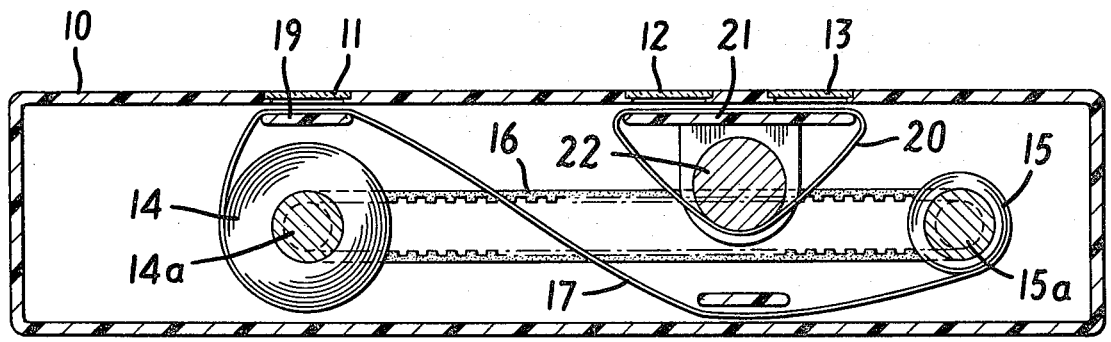
FIG. 3 is a cross sectional view of the apparatus of FIG. 2.
FIG. 4 is a partial view of a web for use in the device of FIG. 2.
FIG. 5 is a partial view of an endless web for use in the device of FIG. 2.

The continuous web 17, illustrated in FIG. 4, comprises a plurality of rows, each row having seven numbers corresponding to the seven metric units in a given parameter. The numbers are spaced so that they are in register with the first row of windows 11 when a row, for example 30a, is positioned thereunder.

The endless web 20, illustrated in FIG. 5 has an alternating series of rows comprising a first row designating the parameter, for example "LINEAR", "WEIGHT" or "LIQUID", printed so that it may be positioned under the third row viewing window 13 for viewing therethrough. A second row designating a set of metric units for each given parameter, for example "kilometer", "hectometer", "decameter", "meter", "decimeter", "centimeter" and "millimeter" for the parameter "Linear" is positioned such that the unit designations appear under the second row of viewing windows 12 for viewing therethrough when the parameter of the first row 40 is positioned under the third row viewing window 13.

When employing the embodiment described in connection with FIGS. 2 through 5, the metric equivalents of a known measurement are obtained by first rotating the knob 23 until the appropriate parameter appears in window 13 or the appropriate unit appears in one of the windows of row 12, whereupon the appropriate set of seven metric unit designations will appear through the remaining windows 12. Secondly, the knob 18 is rotated until the numerical portion of the known measurement appears in the window of the first set of windows 11 corresponding to the window displaying the unit of the given metric measurement. The numerical portions of the metric equivalents of the given metric measurement then appear in the remaining windows of the first set of windows 11 under the appropriate units appearing in the second set of windows 12.

The form of the invention described in connection with the preferred embodiments is illustrative and may be embodied in other forms while still employing the inventive principles contained herein. All such modifications and variations are intended to be within the scope of the invention as defined in the following claims.

I claim:

1. An apparatus for determining the metric equivalents of a given metric measurement comprising:
   (a) a first set of display means arranged on a console to display a plurality of metric units within a given desired parameter selected from the parameters length, liquid and mass or weight;
   (b) a second set of display means arranged on said console to display a given known numerical measurement as expressed in one of the metric units displayed in said first set of display means as well as the numerical equivalents of said measurement as expressed in the remaining metric units displayed in said first set of display means; said second set of display means being arranged such that each of the numerical equivalents is displayed in visual conjunction with the metric unit corresponding to said numerical equivalent; said first set and second set of display means comprising rows of windows with metric units and numerical measurements, respectively, appearing therein;
   (c) parameter selecting means comprising an endless web having a plurality of rows of printed metric unit designations, said printed metric unit designations arranged so as to be aligned with the first row of display windows in said first set of display means when moved in place behind the windows, and means for moving the endless web in place behind the first row of viewing windows for viewing therethrough, each said row of printed metric unit designations being limited to metric units within a single parameter;
   (d) measurement input means and metric equivalent determining means comprising a web having a plurality of rows of printed numbers, each said number being the numerical metric equivalent, of each of the other numbers as expressed respectively in each of the remaining printed metric unit designations, the rows and the numbers in the rows being arranged so that the numbers in a given row will be aligned with the windows in said second set of display means when said row is moved in place behind the windows, and means for moving the web in place behind said windows for viewing therethrough, each of said numbers being further arranged so that each said number is displayed in the window which visually corresponds to an appropriate metric unit designation displayed in the first set of display means such that all of the numbers in a given row as expressed in the visually corresponding metric units are metric equivalents.

2. An apparatus according to claim 1 wherein said first set of display means comprises a first row of seven windows and said second set of display means comprises a second row of seven windows, each of said windows in said first row being arranged so as to visually correspond to a single separate window of said second row.

* * * * *